United States Patent
Aranzulla et al.

(10) Patent No.: US 11,865,995 B2
(45) Date of Patent: Jan. 9, 2024

(54) PASSENGER AIRBAG, VEHICLE OCCUPANT RESTRAINING SYSTEM AND METHOD FOR ADAPTING A PASSENGER AIRBAG

(71) Applicant: ZF AUTOMOTIVE GERMANY GMBH, Alfdorf (DE)

(72) Inventors: Daniele Aranzulla, Mutlangen (DE); Martin Burkhardtsmaier, Schwäbisch-Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/785,268

(22) PCT Filed: Dec. 14, 2020

(86) PCT No.: PCT/EP2020/085919
§ 371 (c)(1),
(2) Date: Jun. 14, 2022

(87) PCT Pub. No.: WO2021/122424
PCT Pub. Date: Jun. 24, 2021

(65) Prior Publication Data
US 2023/0013515 A1    Jan. 19, 2023

(30) Foreign Application Priority Data
Dec. 16, 2019 (DE) ...................... 10 2019 134 522.7

(51) Int. Cl.
*B60R 21/231* (2011.01)
*B60R 21/205* (2011.01)

(52) U.S. Cl.
CPC .......... *B60R 21/231* (2013.01); *B60R 21/205* (2013.01)

(58) Field of Classification Search
CPC ........................... B60R 21/231; B60R 21/205
(Continued)

(56) References Cited

U.S. PATENT DOCUMENTS

| 2002/0043792 A1 | 4/2002 | Keshavaraj |
| 2002/0060449 A1 | 5/2002 | Keshavaraj |

(Continued)

FOREIGN PATENT DOCUMENTS

| DE | 4439259 A1 | 5/1995 |
| DE | 69532776 T5 | 2/2005 |

(Continued)

OTHER PUBLICATIONS

PCT International Search Report for corresponding International Application Serial No. PCT/EP2020/085919, dated Mar. 23, 2021, pp. 1-4.

*Primary Examiner* — Keith J Frisby
(74) *Attorney, Agent, or Firm* — TAROLLI, SUNDHEIM, COVELL & TUMMINO L.L.P.

(57) ABSTRACT

A passenger airbag (12) of a vehicle occupant restraint system (10) is assembled from a first cut piece and a second cut piece, the first cut piece being U-shaped and including a transverse leg, with two longitudinal legs projecting from the opposite ends of the transverse leg. At an inner face (56) of the transverse leg located between the longitudinal legs, a U-shaped inner fabric portion is disposed which is provided to line a module housing and which forms an inflation orifice. The second cut piece has an elongate shape and is connected, at a short lateral edge, to the inner fabric portion to circumferentially close the latter and the inflation orifice. The dimensions of the inner fabric portion are adjusted to a depth (t) of the module housing (18) such that, in the filled state of the passenger airbag (12), the inner face (56) of the first cut piece is positioned at an upper edge (80) of the module housing (18).

11 Claims, 2 Drawing Sheets

(58) Field of Classification Search
USPC .............................................. 280/732, 743.1
See application file for complete search history.

(56) References Cited

U.S. PATENT DOCUMENTS

2012/0261910 A1* 10/2012 Fischer ................. B60R 21/231
280/732
2017/0008477 A1* 1/2017 Luna Nell ............. B60R 21/205
2019/0322238 A1* 10/2019 Gould ................. B60R 21/2338

FOREIGN PATENT DOCUMENTS

| DE | 102008057968 A1 | 5/2010 |
| DE | 102013013979 A1 | 2/2015 |
| DE | 102016107484 A1 | 10/2017 |
| DE | 202017006750 U1 | 4/2018 |

* cited by examiner

PASSENGER AIRBAG, VEHICLE OCCUPANT RESTRAINING SYSTEM AND METHOD FOR ADAPTING A PASSENGER AIRBAG

RELATED APPLICATIONS

This application is a U.S. National Stage Application filed under 35 USC 371, claiming priority to Serial No. PCT/EP2020/085919, filed on 14 Dec. 2020; which claims priority from German Patent Application DE 10 2019 134 522.7, filed 16 Dec. 2019, the entireties of which are hereby incorporated herein by reference.

TECHNICAL FIELD

The invention relates to a passenger airbag, a vehicle occupant restraint system as well as a method for adjusting a passenger airbag.

BACKGROUND

As passenger airbags, there are frequently used three-dimensional airbags the shape of which in the filled state is adjusted to the shape of the clearance between the windscreen and the instrument panel and which have a defined baffle facing the vehicle occupant. Efforts are made to assemble the complex three-dimensional shape of such airbags from as few individual cut pieces as possible which can be cut out of one fabric panel so as to facilitate the sewing operation.

Accordingly, the shape of the airbag is dependent on the respective mounting situation. This includes also the position of a module housing in which the airbag is accommodated in a folded state prior to the case of restraint. If in the vehicle design for example the position or the shape of the module housing or the geometry of the vehicle interior between the instrument panel and the passenger is changed, also the geometry of the airbag must be adjusted.

SUMMARY

It is the object of the invention to facilitate those adjustments.

This object is achieved by a passenger airbag of a vehicle occupant restraint system that is assembled from a first cut piece and a second cut piece, the cut pieces having differently shaped outer contours along which they are connected to each other so that, in a filled state, they enclose an irregularly shaped airbag portion extending in a vehicle interior. The first cut piece is U-shaped having a transverse leg and two longitudinal legs projecting from the opposite ends of the transverse leg. At an inner face of the transverse leg located between the longitudinal legs, a U-shaped inner fabric portion is disposed which is provided to line a module housing and which forms an inflation orifice through which gas released by a gas generator flows into the airbag. The inner fabric portion has a transverse web adjacent to the inner face from the opposite ends of which two longitudinal webs project, said two longitudinal webs being located in an area defined by a space between the two longitudinal legs. The second cut piece has an elongate shape with a first short lateral edge and a second opposite short lateral edge. The second cut piece is connected, at the first short lateral edge, to an outer face of the first cut piece opposite to the inner face and, at the second short lateral edge, to the inner fabric portion to circumferentially close the latter and the inflation orifice.

The irregularly shaped airbag portion forms the area of the airbag which exits from the module housing into the vehicle interior and which usually extends between the instrument panel, the windscreen and the passenger and into which the passenger immerses in the case of restraint.

The inner fabric portion, on the other hand, serves for fastening the passenger airbag inside the airbag module and, consequently, on the vehicle and forms the part of the passenger airbag that remains in the module housing when the airbag is filled.

In accordance with the invention, the airbag portion extending inside the vehicle interior and the area of the airbag serving for the fastening inside the module housing are separately defined and functionally separated at the cut pieces of the passenger airbag so that they can be separately adjusted to the space situation, even regarding the design of the passenger airbag, wherein said adjustments have no or only minor effects on the remaining shape of the cut pieces. Therefore, the design process is facilitated.

It is of further advantage that it is possible to impart a geometrically simple shape, such as an elongate oval shape, to the second cut piece. Even if the geometry must be adjusted, where necessary, in the area of the second short lateral edge, if, e.g., the shape or the depth of the module housing changes, the expenditure for this can be minimized.

The inner face of the first cut piece to which the transverse web of the inner fabric portion adjoins is formed by a straight line at the inner face of the U extending through the two points each of which is predetermined by the transition of the outer contour of the two longitudinal legs into the transverse leg at the inner face of the U.

The outer face is part of the outer contour of the first cut piece, while the short lateral edges are part of the outer contour of the second cut piece.

The transverse web of the inner cut piece possibly does not extend across the whole area between the transition points. Then, the outer contour of the first cut piece is adjusted, between said points and the ends of the transverse web, to those portions of the outer contour of the second cut piece to which it is connected during manufacture of the passenger airbag.

The longitudinal webs preferably project from the transverse leg in the same direction as the longitudinal legs. Each of the longitudinal legs and the longitudinal webs has a free end.

A free length of the transverse web between the longitudinal webs preferably corresponds to a length of the gas generator which supplies the filling gas for the passenger airbag. The gas generator may be, in a known way, a tubular gas generator, the longitudinal axis of which is aligned in parallel to the transverse web.

The transverse web of the inner fabric portion extends preferably in parallel to the transverse leg of the first cut piece and to the inner face. Thus, particularly the position of the gas generator relative to the inner face and, consequently, relative to the first cut piece is predetermined. Usually, the gas generator is arranged in parallel to a vehicle transverse direction inside the vehicle so that the cut pieces can be easily designed for an expansion of the airbag along a centerline of the cut pieces. This, too, facilitates the design process.

The longitudinal webs of the inner fabric portion are, for example, shorter than the longitudinal legs of the first cut piece and are located completely in the space defined between the longitudinal legs. In general, the longitudinal legs constitute the lateral faces of the irregularly shaped airbag portion that extends into the vehicle interior, and thus their length ranges from about 30 to 100 cm, whereas the longitudinal webs serve for fixing the passenger airbag to the gas generator which usually has a length of about 20 to 30 cm. The length of the longitudinal webs may be selected to be shorter than the length of the gas generator. Waste is minimized, when the inner fabric portion is disposed in the space enclosed by the longitudinal legs of the first cut piece.

In a preferred variant, the inner fabric portion merges integrally into the first cut piece. In this case, the inner face forms an imaginary line in the area of the inner fabric portion.

However, it might also be imaginable to manufacture the inner fabric portion as a separate cut piece portion and to connect, for example to sew, it to the remaining first cut piece. The seam line then follows approximately the course of the inner face.

For simple fastening of the passenger airbag to the gas generator and to the module housing, the inner fabric portion may include mounting holes in the transverse web and in the longitudinal webs for fastening bolts of the gas generator.

The second short lateral edge of the second cut piece is connected to the inner fabric portion for example at the outer faces of the longitudinal webs, after the latter have been pulled over the fastening bolts of the gas generator. In this way, the passenger airbag can be circumferentially closed in a substantially gastight manner in the area of the module housing lining formed by the inner fabric portion and of the inflation orifice.

It is also conceivable that the second cut piece includes, at the second short lateral edge, mounting holes for fastening bolts of the gas generator so that also the inflation orifice is closed by the connection of the second short lateral edge of the second cut piece to the fabric portion using the fastening bolts of the gas generator.

The irregularly shaped airbag portion may be designed symmetrically or asymmetrically with respect to a centerline extending through the short lateral edges of the second cut piece; this has no influence on the applicability of the invention. In the mounted and filled state, the centerline usually extends approximately in parallel to a vehicle longitudinal direction.

The invention further relates to a vehicle occupant restraint system comprising a module housing and a passenger airbag as above-described. A width of the transverse web perpendicular to the inner face of the first cut piece and/or a width of the longitudinal webs of the inner fabric portion are adjusted to a depth of the module housing such that the inner face of the first cut piece is positioned, in the filled state of the passenger airbag, on an upper edge of the module housing. In this way, the whole irregularly shaped airbag portion, which serves for positioning the passenger airbag inside the vehicle and for cushioning the vehicle occupant, is located outside the module housing, whereas the whole inner fabric portion is retained inside the module housing. Since only the dimensions of the inner fabric portion and, where necessary, an area of the second short lateral edge of the second cut piece must be modified, the passenger airbag can be easily adjusted to different dimensions of module housings.

The width of the longitudinal webs is viewed perpendicular to the longitudinal extension thereof toward the free end. It has to be taken into account, of course, that the extension of an area comprising the mounting holes as well as seam allowances or the like possibly must be subtracted from the actual width of the respective portion so that an "effective" width which corresponds to the actual function is to be considered.

In addition, the invention relates to a method for adjusting a passenger airbag of an afore-described vehicle occupant restraint system to a predefined mounting situation in a vehicle. In so doing, the inner fabric portion is adjusted so that a width of the transverse web perpendicular to the inner face of the first cut piece, a width of the longitudinal webs and/or an angle between the longitudinal webs and the transverse web are adjusted to a depth of the module housing such that, in the filled state of the passenger airbag, the inner fabric portion ends at an upper edge of the module housing. As it is easily possible to change the design and the dimensions of the inner fabric portion, the inner fabric portion can be tailored to the module housing with low effort. In particular, the inner fabric portion rests smoothly against an inner wall of the module housing when the passenger airbag is completely filled.

By changing the angle between the longitudinal webs and the transverse web, certain adjustment to the depth of the module housing can be made even without changing the dimensions of the inner fabric portion.

The angle under which the respective longitudinal webs project from the transverse web can be selected in relation to the depth of the module housing so that, when the module housing is shallower, the angle is selected to be more acute than when the module housing is deeper. By increasing the angle to more than 90°, adjusting to a deeper module housing is possible, for example, while, by reducing the angle to less than 90°, the passenger airbag can be adjusted to a less deep module housing.

If necessary, when adjusting the airbag, also a length of the second cut piece between the two short lateral edges must be adjusted to the depth of the module housing, wherein specifically only the geometry in the area of the second short lateral edge is changed, however, without changing the shape of the irregularly shaped airbag portion as such.

BRIEF DESCRIPTION OF THE DRAWINGS

In the following, the invention will be described in detail by means of an embodiment with reference to the attached drawings, wherein.

DESCRIPTION

Figure 1:
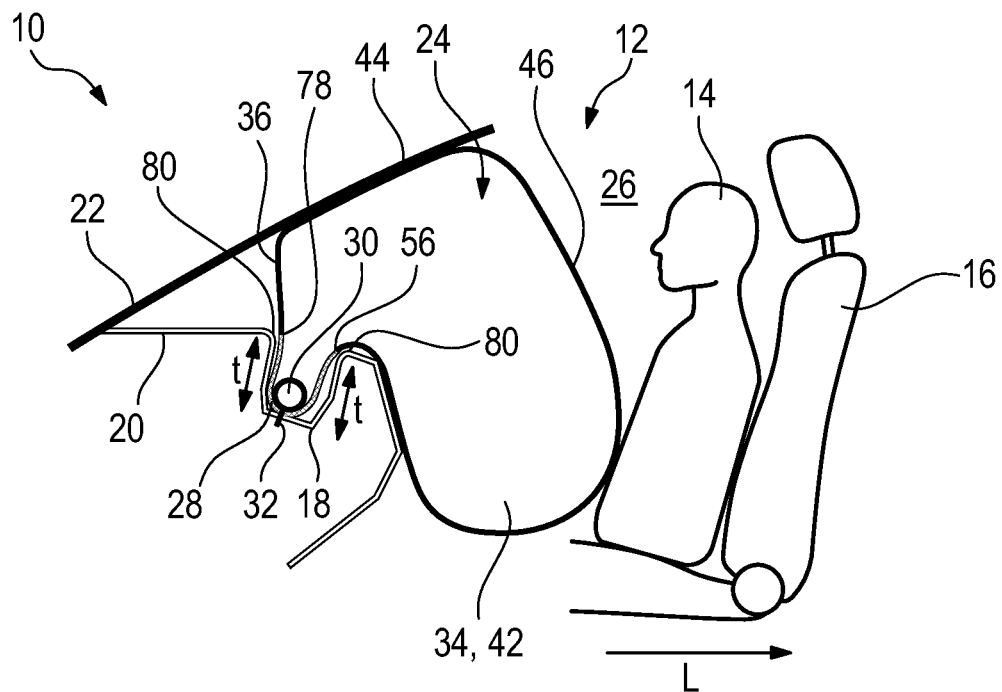
FIG. 1 shows a schematic representation of a vehicle occupant restraint system according to the invention comprising a passenger airbag according to the invention in a completely filled state to carry out a method according to the invention.

FIG. 1 illustrates a vehicle occupant restraint system 10 comprising a passenger airbag 12 that is provided to cushion a passenger 14 seated on a vehicle seat 16 in a case of restraint.

In normal driving operation, the passenger airbag 12 is accommodated in a folded state in a module housing 18 which, in this example, is accommodated in an upper side of an instrument panel 20.

FIG. 1 illustrates how the passenger airbag 12 extends in the filled state between the instrument panel 20, a windscreen 22 of the vehicle and the passenger 14. Conceptually, the passenger airbag 12 can be divided into two functionally different areas. One of the areas is formed by an irregularly shaped airbag portion 24 consisting of the part of the passenger airbag 12 which, in the filled state, has exited the module housing 18 and is positioned in the vehicle interior 26. The other area is formed by an inner fabric portion 28 which lines the module housing 18 and which is retained inside the module housing 18 even in the filled state of the passenger airbag 12, and which connects the whole passenger airbag 12 to the module housing 18 and, thus, to the vehicle.

This connection is made, for example, using a gas generator 30, in this case an elongate tubular gas generator, which supplies, in the case of restraint, the filling gas for the passenger airbag 12 and which has fastening bolts 32 used to fasten the passenger airbag 12, as will be described in the following.

Figure 2:
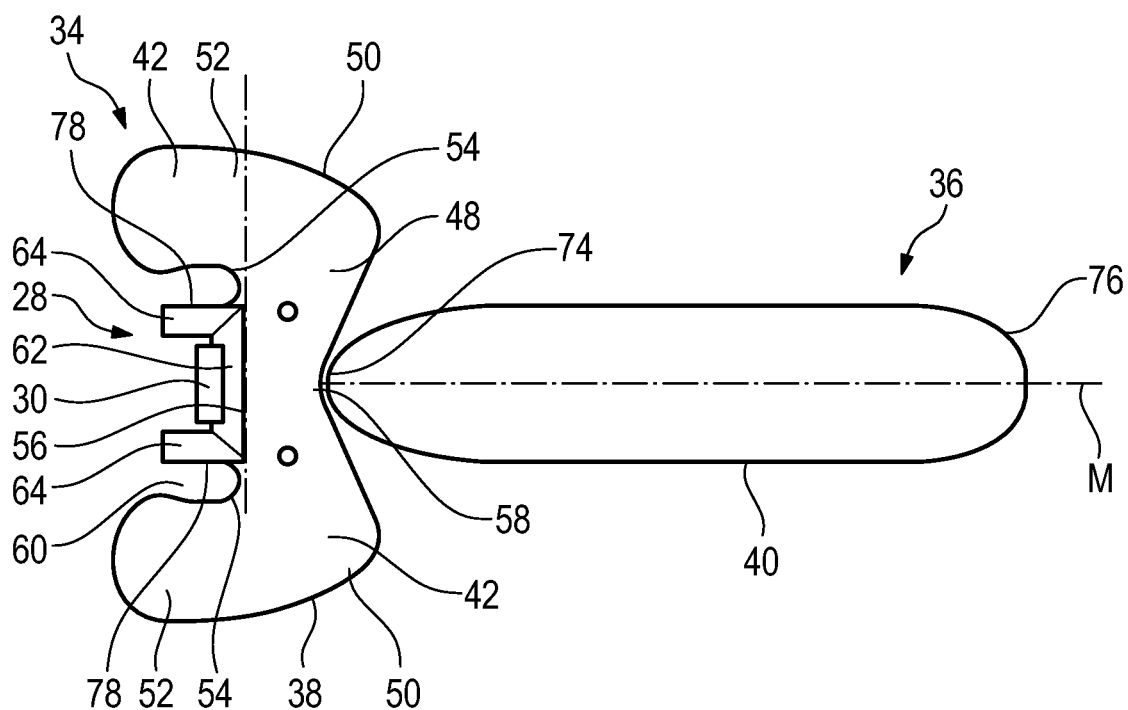
FIG. 2 shows a schematic representation of the flatly spread cut pieces of the passenger airbag from FIG. 1.

FIG. 2 illustrates the flatly spread cut of the passenger airbag 12. The passenger airbag 12 is composed of exactly two cut pieces, namely a first cut piece 34 and a second cut piece 36. Both cut pieces 34, 36 are cut out of a flatly spread airbag fabric in this case.

In this example, the inner fabric portion 28 is part of the first cut piece 34 and is particularly integrally connected thereto.

As a matter of course, additional fabric pieces which form, e.g., reinforcing layers may further be provided, as is known; they are not relevant to the invention, however, and therefore are not considered here.

The two cut pieces 34, 36 have differently shaped outer contours 38, 40 which are matching in terms of length, however, so that the two cut pieces 34, 36 can be connected to each other along their outer contours 38, 40. While each of the two cut pieces 34, 36 can be flatly spread per se, the resulting three-dimensional passenger airbag 12 cannot be spread any more.

In the irregularly shaped airbag portion 24, the two cut pieces 34, 36 are completely connected, such as sewn, to each other along their outer contours 38, 40.

The first cut piece 34 forms, inter alia, two oppositely directed lateral faces 42 of the filled passenger airbag 12, while the second cut piece 36 forms a jacket portion 44 peripheral along the vehicle longitudinal direction L which also comprises a baffle 46 for cushioning the passenger 14 (see FIG. 1).

An imaginary centerline M of the second cut piece 36 (see FIG. 2) is in parallel to the vehicle longitudinal direction L in the mounted and filled state of the passenger airbag 12.

The second cut piece 36 is symmetrical to said centerline M. But an asymmetric shape could also be chosen.

As illustrated in FIG. 2, the first cut piece 34 is U-shaped, with a transverse leg 48 from each of the ends 50 of which a longitudinal leg 52 projects approximately perpendicularly in this case.

At the positions where the longitudinal legs 52 merge into the transverse leg 48, a transition point 54 is formed at the inner bend of the U. A straight line extending through said two transition points 54 forms an inner face 56 of the first cut piece 34 between the two transition points 54.

At the portion of the outer contour 38 of the first cut piece 34 which is opposite to the inner face 56, the outer contour 38 forms an outer face 58.

In the inner bend of the U, viz. in a space 60 between the two longitudinal legs 52, the inner fabric portion 28 is arranged at the inner face 56.

The inner fabric portion 28 is equally U-shaped and has a transverse web 62 from which a longitudinal web 64 projects at each end side, wherein both longitudinal webs 64 from the transverse web 62 face the same direction, as this is also the case with the longitudinal legs 52 and the transverse leg 48 of the first cut piece 34.

FIG. 2 illustrates that the inner fabric portion 28 is completely accommodated in the space 60 between the longitudinal legs 52. Hence, the longitudinal webs 64 are shorter in the direction to their free ends 66 than the longitudinal legs 52, when viewed in the same direction starting from the straight line defining the inner face 56.

Figure 3:
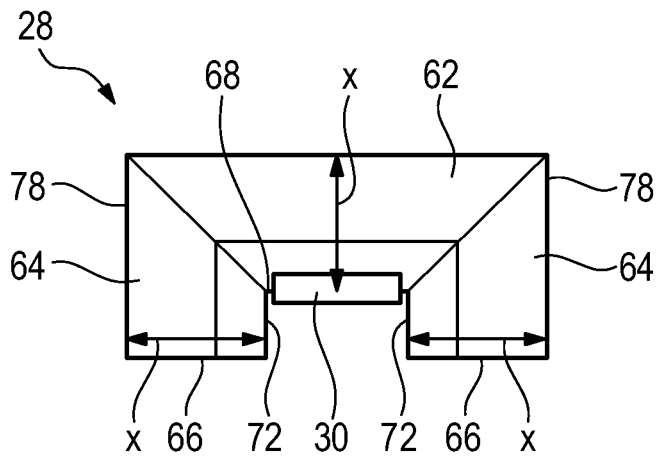
FIG. 3 shows a schematic representation of an inner fabric portion of the passenger airbag from FIG. 1.

FIG. 3 shows an enlarged representation of the inner fabric portion 28.

A free length 68 of the transverse web 62 between the two longitudinal webs 64 corresponds approximately to the length of the gas generator 30.

The transverse web 62 is aligned in parallel to the gas generator 30, and in the transverse web 62 plural mounting holes 70 are provided through which the fastening bolts 32 of the gas generator 30 are put through when mounting the passenger airbag 12 in the module housing 18.

Further mounting holes 70 are provided at the longitudinal webs 64, namely in the area of inner sides 72 which face the U enclosed by the inner fabric portion 28.

During mounting, also said mounting holes 70 in the longitudinal webs 64 are pulled over the fastening bolts 32 of the gas generator 30 so that the longitudinal webs 64 are folded over the transverse web 62. The length of the longitudinal webs 64 is selected to be shorter than the length of the transverse web 62, a certain overlapping of the two longitudinal webs 64 in the mounted state being desirable.

The second cut piece 36 is elongate along the centerline M and has a first short lateral edge 74 and an opposite second short lateral edge 76 on each of its narrow sides (see FIG. 2).

Both short lateral edges 74, 76 are part of the outer contour 40 of the second cut piece 36. The first short lateral edge 74 is connected to the part of the outer contour 38 of the first cut piece 34 forming the outer face 58 of the first cut piece 34, as indicated by the positions of the two cut pieces 34, 36 in FIG. 2.

The second cut piece 36 is folded perpendicularly to the image plane along the centerline M so that the second short lateral edge 76 is located in the area of the inner fabric portion 28.

The second short lateral edge 76 is fastened on the inner fabric portion 28. This can be done, for example, by providing, in the area of the second short lateral edge 76, also mounting holes 70 which are pulled over the fastening bolts 32 of the gas generator 30. In another variant, it is also imaginable that the second short lateral edge 76 is connected, for example sewn, to outer faces 78 of the two longitudinal webs 64 of the inner fabric portion 28. In each case, the passenger airbag 12 and in particular an inflation orifice that is formed by the inner fabric portion 28 and the second short lateral edge 76 is closed by means of fastening the second short lateral edge 76. In the mounted state, this connection is substantially gastight by the abutment on the gas generator 30 and on the bottom of the module housing 18, as this is known from conventional airbags.

When the passenger airbag 12 is mounted in the module housing 18 and is filled, it is positioned so that the inner face 56 of the first cut piece 34 is disposed at an upper edge 80 of the module housing 18, at the edge of the module housing 18 facing the passenger 14 and the vehicle seat 16.

In other words, the transverse web 62 of the inner fabric portion 28 ends as precisely as possible at the upper edge 80 of the module housing 18. At this point, the transverse web 62 merges into the first cut piece 34, and the remainder of the first cut piece 34 is located, when viewed along the centerline M away from the transverse web 62, outside the module housing 18 and is part of the irregularly shaped airbag portion 24. In the example shown here, this area of the passenger airbag 12 is located above the instrument panel 20.

The inner fabric portion 28 ends with the outer face 78 of the longitudinal webs 64 at the opposite portion of the upper edge 80 of the module housing 18. The second cut piece 36 is fixed with its second short lateral edge 76 to this point and then extends toward the windscreen 22.

This geometry is clearly visible in FIG. 1.

The passenger airbag 12 includes two functionally separate areas. On the one hand, this is the irregularly shaped airbag portion 24 that takes over the shaping of the passenger airbag 12 and the cushioning of the passenger 14, and, on the other hand, this is the inner fabric portion 28 that serves for the fastening.

Correspondingly, when the design is changed, for example due to a changed geometry of the instrument panel 20 and the windscreen 22 in the vehicle interior 26, substantially only the areas of the cut which relate to the irregularly shaped airbag portion 24 must be adjusted. In this case, these are the second cut piece 36 as well as the first cut piece 34 except for the inner fabric portion 28. If, however, the shape of the module housing 18 such as the depth t thereof perpendicular to the instrument panel 20 changes, substantially only the inner fabric portion 28 and, where necessary, a length of the second cut piece 36, viz. a distance along the centerline M of the first and second short lateral edges 74, 76, must be adjusted.

A width x of the transverse web 62 in this case corresponds to a width x of the two longitudinal webs 64 perpendicular to the outer face 78 thereof. The width x less a material width at the transverse web 62 and at the longitudinal webs 64, in which the mounting holes 70 are provided and which is wrapped around the gas generator 30 and, in the mounted state, is located on the bottom of the module housing 18 between the latter and the gas generator 30, corresponds to the depth t of the module housing 18 extending into the instrument panel 20.

Hence, by changing the width x of the transverse web 62 and of the longitudinal webs 64, the passenger airbag 12 can be adjusted to an altered depth t of a module housing 18.

In the example shown in FIG. 2, the two longitudinal webs 64 project perpendicularly from the transverse web 62.

Figure 4:
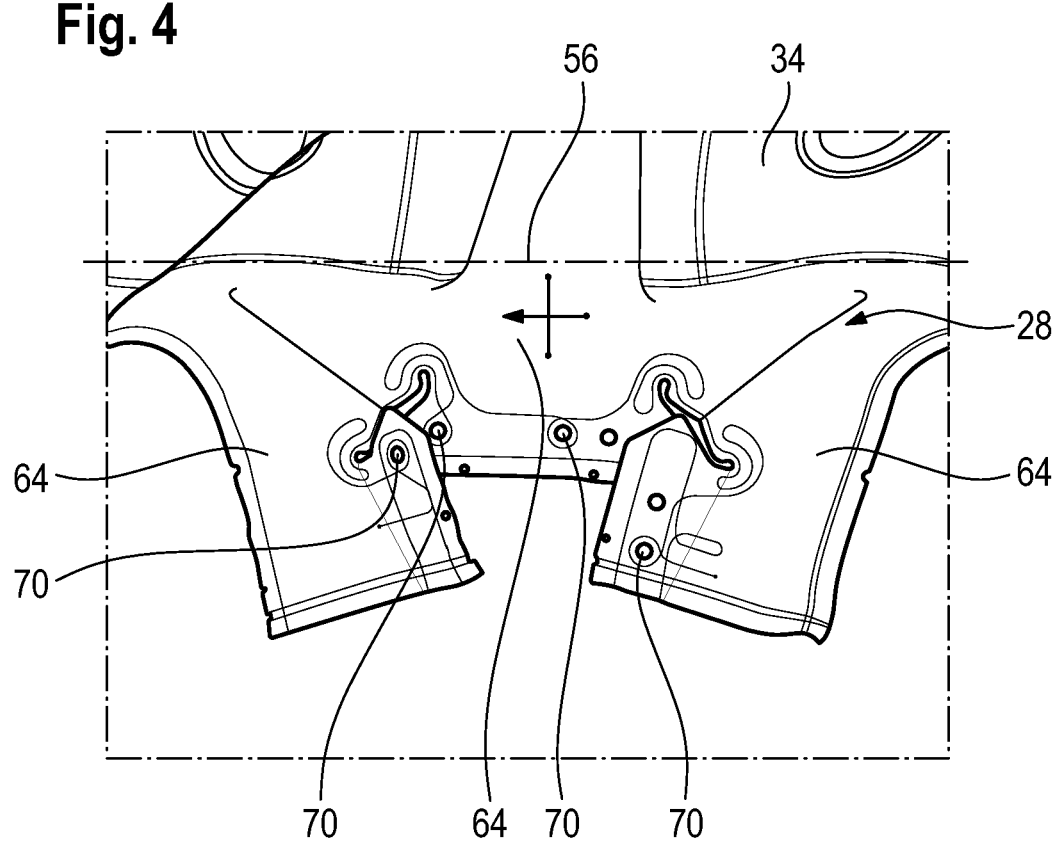
FIG. 4 shows a schematic representation of a change of the angle between the longitudinal webs and the transverse web of the inner fabric portion from FIG. 3.

The angle between the longitudinal web 64 and the transverse web 62 is variable, however, as is illustrated in FIG. 4, for example. There an angle of less than 90° is selected. An angle of more than 90° would also be possible. The angle between the longitudinal webs 64 and the transverse web 62 can be set either directly by the cut of the inner fabric portion 28 or, as shown in FIG. 4, by appropriately positioned seams in a cut which includes longitudinal webs 64 projecting at right angles.

In particular, minor adjustments can be adapted to an altered depth t of the module housing 18 by varying the angle between the longitudinal web 64 and the transverse web 62. In so doing, an increase in the angle to more than 90° results in an adjustment to a larger depth t of the module housing 18, and a decrease of the angle to less than 90° results in an adjustment to a smaller depth t of the module housing 18.

Using the passenger airbag 12 described here and the vehicle occupant restraint system 10, an adjustment to changed geometries in the vehicle interior 26 or in the area of the module housing 18 can be easily made, as the shaping portion of the passenger airbag 12 located in the vehicle interior 26 is functionally separate from the fastening of the passenger airbag 12 in the module housing 18 for which the inner fabric portion 28 is utilized, and this reflects in the configuration of the cut pieces 34, 36.

The invention claimed is:

1. A passenger airbag of a vehicle occupant restraint system which is assembled from first and second cut pieces, wherein the cut pieces have differently shaped outer contours along which they are connected to each other so that, in a filled state, they enclose an irregularly shaped airbag portion extending in a vehicle interior,
wherein the first cut piece is U-shaped having a transverse leg with two longitudinal legs projecting from the opposite ends thereof,
wherein, on an inner face of the transverse leg located between the longitudinal legs, a U-shaped inner fabric portion is disposed which is provided to line a module housing and which forms an inflation orifice through which gas released by a gas generator flows into the passenger airbag, wherein the inner fabric portion includes a transverse web adjacent to the inner face, with two longitudinal webs located in an area defined by a space between the two longitudinal legs projecting from the opposite ends of said transverse web, and
wherein the second cut piece has an elongate shape including a first short lateral edge and a second opposite short lateral edge, and wherein the second cut piece is connected at the first short lateral edge to an outer face of the first cut piece opposite to the inner face and at the second short lateral edge is connected to the inner fabric portion to circumferentially close the latter and the inflation orifice.

2. The passenger airbag according to claim 1, wherein the transverse web of the inner fabric portion extends in parallel to the transverse web of the first cut piece and to the inner face.

3. The passenger airbag according to claim 1, wherein the longitudinal webs of the inner fabric portion are shorter than the longitudinal legs of the first cut piece and are located completely in the space defined between the longitudinal legs.

4. The passenger airbag according to claim 1, wherein the inner fabric portion merges integrally into the first cut piece.

5. The passenger airbag according to claim 1, wherein the inner fabric portion includes mounting holes in the transverse web and in the longitudinal webs for fastening bolts of the gas generator.

6. The passenger airbag according to claim 1, wherein the irregularly shaped airbag portion is symmetrical relative to a centerline of the second cut piece extending through the short lateral edges.

7. A vehicle occupant restraint system comprising a module housing and a passenger airbag according to claim 1, wherein a width of the transverse web perpendicular to the inner face of the first cut piece and/or a width of the longitudinal webs of the inner fabric portion is/are adjusted to a depth of the module housing such that, in the filled state of the passenger airbag, the inner face of the first cut piece is positioned at an upper edge of the module housing.

8. A method for adjusting a passenger airbag of a vehicle occupant restraint system according to claim 7 to a predefined mounting situation in a vehicle, in which method the inner fabric portion is adjusted so that a width of the transverse web perpendicular to the inner face of the first cut piece, a width of the longitudinal webs, and/or an angle between the longitudinal webs and the transverse web are adjusted to a depth of the module housing such that, in the filled state of the passenger airbag, the inner fabric portion ends at an upper edge of the module housing.

9. The method according to claim 8, wherein the angle at which each of the longitudinal webs projects from the transverse web is selected in relation to the depth of the module housing, the angle being selected to be more acute in a shallower module housing than in a deeper module housing.

10. The method according to claim 8, wherein a length of the second cut piece between the two short lateral edges is adjusted to a depth of the module housing.

11. The method according to claim 8, wherein a length of the second cut piece between the two short lateral edges is adjusted to a depth of the module housing without changing the shape of the irregularly shaped airbag portion.

\* \* \* \* \*